BEST AVAILABLE COPY
John S. Rowell & M. F. Lowth
Seeding Machine
No. 3,373. Fig. 1. Reissued April 13, 1869.
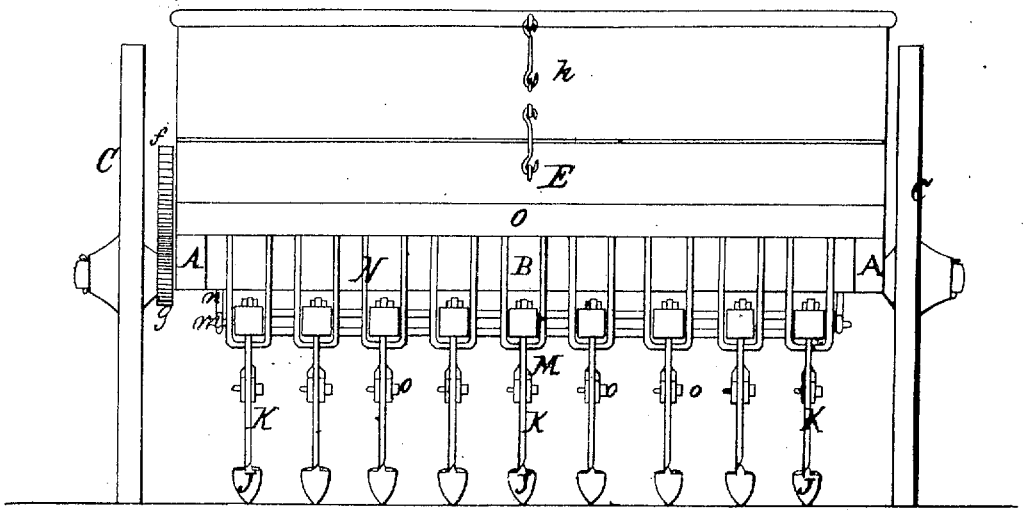
Fig. 4.
Fig. 2.
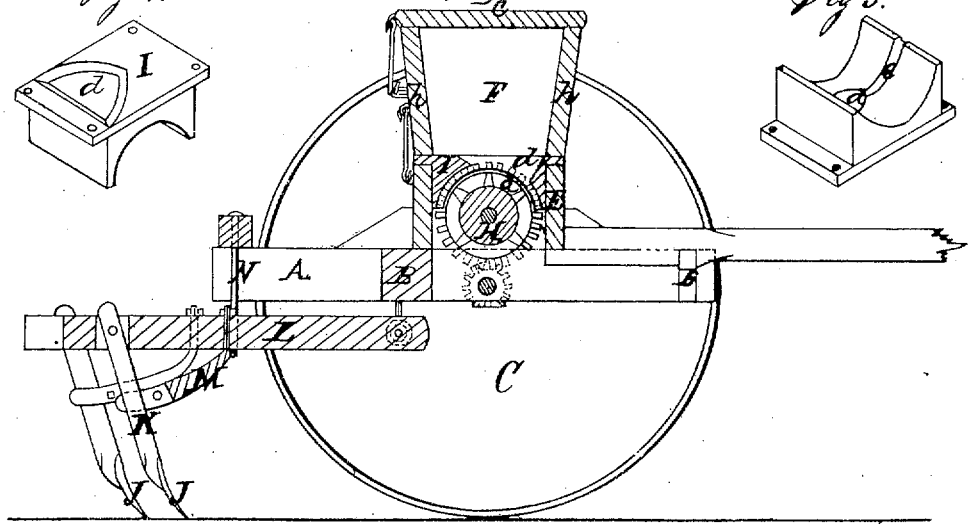
Fig 5.
Fig 3.
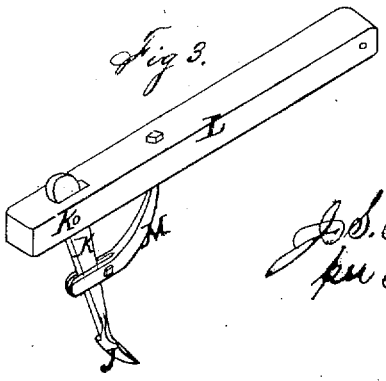
Witnesses.
J. Alfred Ellis
J. V. White.
Inventors
J. S. Rowell & M. F. Lowth
per G. H. Alexander
Atty.

UNITED STATES PATENT OFFICE.

J. S. ROWELL AND IRA ROWELL, OF BEAVER DAM, WISCONSIN, ASSIGNEES OF J. S. ROWELL AND MICHAEL F. LOWTH, OF SAME PLACE.

IMPROVEMENT IN SEEDING-MACHINES.

Specification forming part of Letters Patent No. 36,672, dated October 14, 1862; Reissue No. 3,373, dated April 13, 1869.

*To all whom it may concern:*

Be it known that we, J. S. ROWELL and IRA ROWELL, of Beaver Dam, in the county of Dodge and State of Wisconsin, have by grant duly recorded in the Patent Office become the owners of the entire right for the United States to certain Improvements in Seeding-Machines for which Letters Patent of the United States were granted to JOHN S. ROWELL and MICHAEL F. LOWTH, of the same place, bearing date the 14th day of October, A. D. 1862; and we do hereby declare that the following is a full and exact description thereof, reference being had to the accompanying drawings, and to the letters of reference marked thereon.

Figure 1 represents a rear end elevation of a machine embodying this invention. Fig. 2 is a longitudinal vertical section of the same in the line *x x* of Fig. 1. Fig. 3 represents by a perspective view a cultivator-tooth and drag-bar detached from the machine. Fig. 4 represents by a perspective view one of the caps covering the seed-cylinder, and Fig. 5 represents an inverted view of the same.

This invention consists in a peculiar construction of arched caps which cover the seed-cylinder, whereby the seed in passing from the hopper into the ground is prevented from being crushed between the cylinder and cap, as will be hereinafter explained.

The invention also consists in the employment or use of a forked or friction brace in connecting the shank or standard of the cultivator-tooth to its drag-bar, for the purpose of allowing the tooth so connected to yield, and thus prevent its being broken or bent or otherwise injured when brought in contact with any obstruction too large for it to remove without danger of producing the result above mentioned.

To enable others skilled in the art to make and employ this invention, we will proceed to describe its construction and operation.

The frame of the seeding-machine is composed of the side pieces, A A, and cross-pieces B B, which are mortised together in the usual manner. This frame is supported on two wheels, C C, fitted to revolve on the ends of the axle D, which passes transversely through mortises in the side pieces of the frame, or may be attached to their under side.

E is an oblong rectangular box placed directly over the axle D, so as to rest at its rear bottom edge on the cross-piece B, and in front on the side pieces, A A. This box incloses the seed distributing and measuring device, which consists of a series of hubs, H, having depressions or cells *a* formed in their peripheries, to catch and measure the grain as it comes through the openings in the hopper, secured equidistant apart on the shaft *b*, which is supported at its ends in boxes resting upon and attached to the side pieces of the frame.

The top of the box E forms the bottom of the hopper F, which is formed with downwardly-converging sides *h h'*, which at their lower ends are flush with the front and back sides of the box, respectively, and attached to the box E in front by hinges, so that it can be turned over to facilitate the cleaning of the same, and of the seed-distributing mechanism. The hopper is furnished with a hinged lid, *c*, and is fastened in position for sowing by a hook and staple. At equal distances apart, corresponding with the distance of the seed-cylinders on their shaft, openings are made through the hopper-bottom to allow boxes or caps I, of which there is a corresponding number with the seed-cylinders, to be inserted flush with its top surface. The boxes or caps I, which are made in circular form on their under side to conform to the periphery of the seed-cylinders, have a triangular opening, *d*, made through them, through which the seed passes from the hopper into the cells in the seed-cylinders. This opening *d* is made with one side of the triangle next to and parallel with the front side of the box E, it being parallel with the axis of the seed-cylinders H. Instead of being made directly over the latter, the opening *d* is made a little in advance of it. From the rear side of the opening *d*, and passing rearwardly on the under side and circular portion of the box or cap I, a groove, *e*, (shown in Figs. 2 and 5,) is formed in the cap, of sufficient size to allow a kernel of corn to pass through it, around with the cylinder, without being crushed between the cylinder and cap. The axle *b* of the seed-cylinders is provided on one end with a gear-wheel, *f*, which gears into and is driven by a gear-wheel, *g*, secured on the inner end of the hub of the wheel C.

The cultivator-teeth J are formed on the lower ends of shanks K, which are secured by pivots *k* at their upper ends in mortises cut in the rear ends of the horizontal bars L. These bars L are attached to the machine at their forward ends by a shaft, *m*, which passes loosely through them, and is supported in the lower ends of arms or standards *n*, depending from the cross bar or piece B.

M is a forked brace, which terminates at one end in a screw-bolt, whereby it is secured in the horizontal bar L. The jaws of the lower or forked end of this brace embrace the two opposite sides of the shank K of the drill-teeth J, and thereby hold them by friction alone against casual movement backward, except when the teeth are brought in contact with an obstruction too great to be removed by them without danger of breaking or otherwise damaging the teeth. The degree of pressure with which the shanks of the teeth are clamped and resistance the teeth are capable of offering to any obstructions in the ground with which they may be brought in contact are governed by means of the screws *o*, one of which passes through the jaws of each brace and serves to draw them together, so as to clamp the shanks with more or less firmness.

The horizontal bars L are placed loosely on the shaft *m* and kept an equal distance apart by collars placed between on the shaft. The rear ends of the bars are braced or prevented from reeling or dodging about by the yokes N, which depend from a cross-piece, O, and within which the bars are confined laterally, but permitted to rise and fall independently of each other within certain limits.

The hopper being filled with seed and the team started ahead, the seed passes through the openings in the bottom of the hopper into the depressions or cells in the seed-cylinders, which as they are revolved discharge the seed into the ground in the usual manner. As the cylinders revolve the quantity of seed resting on top of the wings forming the receptacles is reduced so much as the wings approach the side of the openings in the cap or bottom of the hopper that any seed then remaining on the wings may pass around with the cylinder in the groove without the least danger of being crushed.

The manner of attaching the cultivator-teeth to the drag-bars by forked or friction braces, in addition to the perfect security given to the teeth against being broken by contact with an obstruction too great to be removed by them, enables the angle or pitch of the teeth to be varied in the ground to suit different kinds of soil or seed to be sown. The cultivator-teeth, on striking a large obstruction, slip through the jaws of the forked braces and assume such an angle as to allow them to easily ride the obstruction, and thereby save them from being broken or otherwise injured.

Having thus described this machine, what we claim as new, and desire to secure by Letters Patent, is—

1. The triangular openings *d* and groove *e* in the cap I, in combination with the seed-cylinders H, when arranged to operate in the manner and for the purpose specified.

2. Broadly, the brace M, constructed and arranged so to clamp the shank K that it will retain its position when the shovel J is used in tillable soil, yet hold it in such a manner that it will loosen its hold on the shank and allow it to swing back on the pivot *k* when the shovel meets with obstructions, as specified.

3. The combination of the forked or friction brace M with the pivot *k*, for connecting the shanks K, and consequently the cultivator-teeth J, to their drag-bars L, substantially as described.

In testimony that we claim the foregoing as our own we affix our signatures in the presence of two witnesses.

JOHN S. ROWELL.
IRA ROWELL.

In presence of—
R. V. BOGERT,
R. E. THOMAS.